(12) United States Patent
Tortosa-Boonacker

(10) Patent No.: US 7,686,383 B2
(45) Date of Patent: Mar. 30, 2010

(54) RETRACTABLE CURVED AIR DAM

(75) Inventor: Nina Tortosa-Boonacker, Troy, MI (US)

(73) Assignee: GM Global Technology Operations, Inc., Detroit, MI (US)

( * ) Notice: Subject to any disclaimer, the term of this patent is extended or adjusted under 35 U.S.C. 154(b) by 0 days.

(21) Appl. No.: 12/199,106

(22) Filed: Aug. 27, 2008

(65) Prior Publication Data

US 2010/0052361 A1 Mar. 4, 2010

(51) Int. Cl.
*B60J 9/04* (2006.01)
(52) U.S. Cl. .................................................. 296/180.1
(58) Field of Classification Search ... 296/180.1–180.5; 180/903
See application file for complete search history.

(56) References Cited

U.S. PATENT DOCUMENTS

| | | | | |
|---|---|---|---|---|
| 3,618,998 A * | 11/1971 | Swauger | ................... | 296/180.5 |
| 4,119,339 A * | 10/1978 | Heimburger | ............. | 296/180.5 |
| 4,131,308 A * | 12/1978 | Holka et al. | ............. | 296/180.5 |
| 4,325,563 A * | 4/1982 | Brandon et al. | ............. | 280/851 |
| 4,398,764 A * | 8/1983 | Okuyama | ................. | 296/180.1 |
| 4,585,262 A * | 4/1986 | Parks | ....................... | 296/180.1 |
| 4,683,974 A * | 8/1987 | Richardson | ................. | 180/274 |
| 4,693,506 A * | 9/1987 | Massengill | ............... | 296/180.3 |
| 4,976,489 A * | 12/1990 | Lovelace | .................. | 296/180.1 |
| 5,092,648 A * | 3/1992 | Spears | ...................... | 296/180.3 |
| 5,317,880 A * | 6/1994 | Spears | .......................... | 62/239 |
| 5,429,411 A * | 7/1995 | Spears | ..................... | 296/180.1 |
| 5,522,637 A * | 6/1996 | Spears | ..................... | 296/180.3 |
| 5,536,062 A * | 7/1996 | Spears | ..................... | 296/180.3 |
| 5,653,493 A * | 8/1997 | Spears | ..................... | 296/180.2 |
| 6,079,769 A * | 6/2000 | Fannin et al. | ............ | 296/180.1 |
| 6,099,069 A * | 8/2000 | Spears | ..................... | 296/180.2 |
| 2006/0237991 A1 * | 10/2006 | Savo | ....................... | 296/180.5 |
| 2008/0303309 A1 * | 12/2008 | Dayton | ..................... | 296/180.1 |

* cited by examiner

*Primary Examiner*—Hilary Gutman
(74) *Attorney, Agent, or Firm*—Quinn Law Group, PLLC

(57) ABSTRACT

A retractable curved air dam assembly is provided for improving the aerodynamic characteristics of a motor vehicle. The air dam assembly is segmented to include a plurality of panel members each adapted to pivotably attach to the underside of the front-end vehicle structure. The panel members are configured to selectively transition between a deployed position, in which the panel members are preferably in a generally vertical orientation, and a stowed position, in which the panel members are in a generally horizontal orientation. The panel members are shingled (i.e., partially overlapped) such that pivoting a center panel from the deployed position to the stowed position thereby pivots the side panels to the stowed position, and such that pivoting a side panel from the stowed position to the deployed position thereby pivots the center panels to the deployed position.

18 Claims, 1 Drawing Sheet

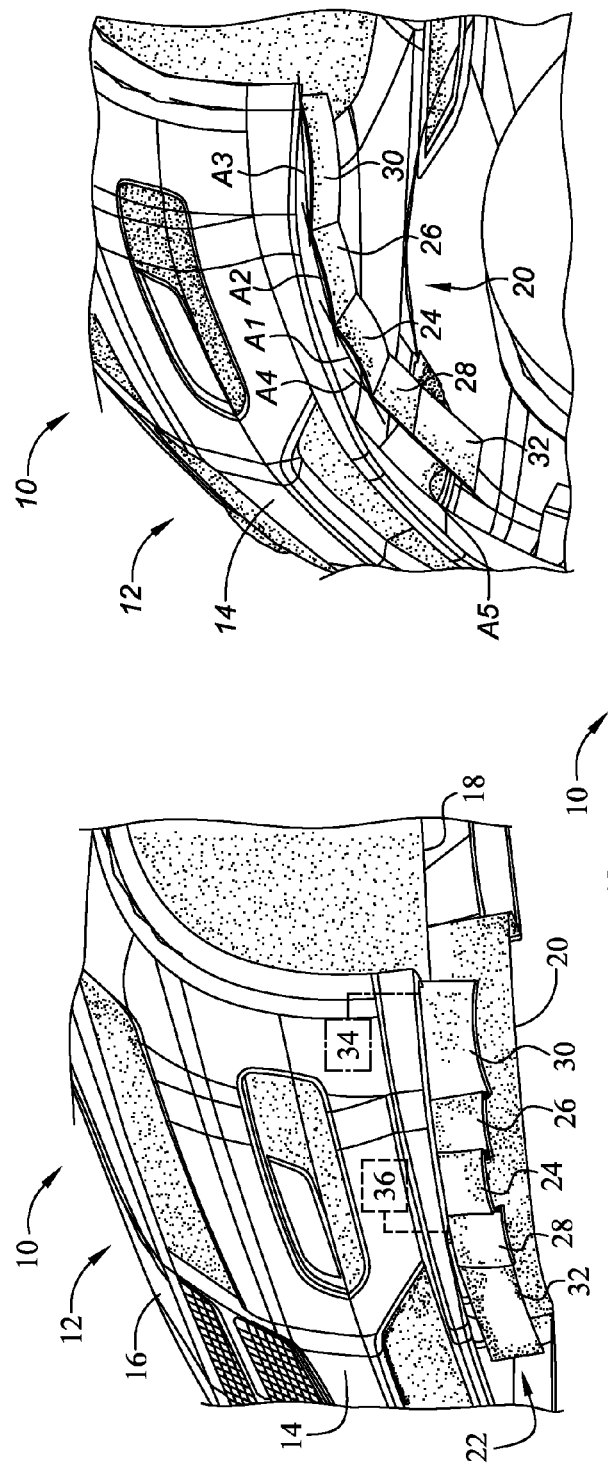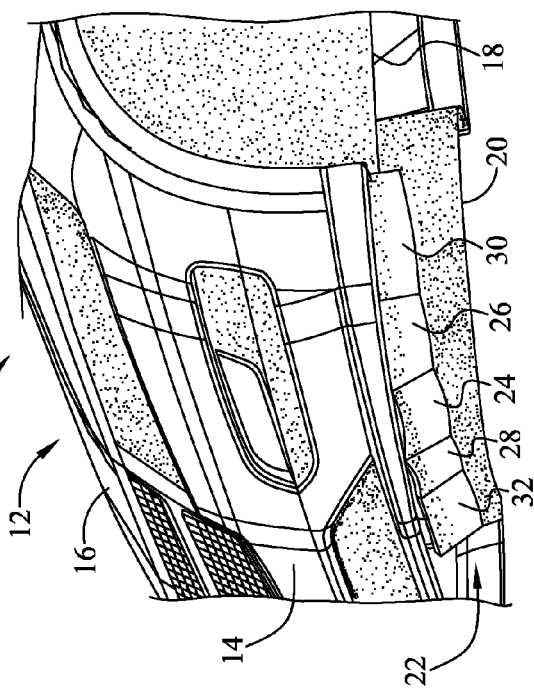

RETRACTABLE CURVED AIR DAM

TECHNICAL FIELD

The present invention relates generally to devices for improving vehicle aerodynamics, and more specifically to retractable air dams for motor vehicles.

BACKGROUND OF THE INVENTION

Many conventional motor vehicles, such as the modern-day automobile, include an air dam that is engineered to improve the aerodynamic characteristics of the vehicle body. A traditional air dam, which is sometimes referred to as an "air deflector", is mounted on the underside of the front-end structure of the vehicle body, extending downward into proximity with the roadway. Air dams improve the handling and control of the motor vehicle, increase fuel economy, and also improve the routing of air flow for cooling/heat exchange in the vehicle powertrain and air conditioning systems by managing the flow of turbulent air under and around the vehicle chassis and affecting internal airflows.

An air dam that is fixedly suspended from underneath the front-end structure of the vehicle may be damaged upon impact with a curb, driveway incline, or other roadway obstruction. Many air dams are fabricated from molded plastic or fiber-reinforced polymer, which can yield to some extent upon contact with an obstruction. However, vehicle styling considerations may dictate that the air dam have a curved shape when viewed in the plan view. Such curved configurations inherently stiffen the air dam, which in turn limits the extent to which the air dam can yield when striking a curb or other obstruction.

To minimize or eliminate damage to the air dam, some prior art approaches propose movably mounting the air dam beneath the front-end structure of the vehicle body. Prior art retractable air dams typically translate linearly from a stowed position, in which the air dam is raised above the road surface and stored in an internal cavity, and a deployed position, in which the air dam is lowered into proximity with the roadway. At lower speeds when the air dam is relatively ineffective, the air dam remains in the stowed position so as to eliminate inadvertent contact with roadway obstructions. At higher speeds where roadways tend to maintain negligible gradients and have no obstructions, the air dam is lowered to reduce aerodynamic drag.

SUMMARY OF THE INVENTION

Presented herein is a segmented, retractable air dam assembly with plan view curvature for improving the aerodynamic characteristics of a motor vehicle. The air dam of the present invention can be positioned as low as needed for optimal aerodynamic performance, and stowed during operating conditions when optimal positioning might violate ramp angle and curb criteria. In addition, the air dam assembly is adapted to fold back or yield when hit by a parking curb, ramp, road incline, or other obstruction. The air dam design presented herein increases fuel economy (or vehicle range), eliminates inadvertent damage or breakage, improves cooling airflow, and eliminates the additional packaging space required for prior art retractable air dams.

In accordance with one embodiment of the present invention, the air dam assembly includes a plurality of panel members configured to pivotably attach to the front vehicle structure in curvilinear relation to one another. The panel members are adapted to selectively transition between a first position, in which the panel members are in a deployed state, and a second position, in which the panel members are in a stowed state.

According to one aspect of this particular embodiment, the plurality of panel members includes at least a first and a second panel member that at least partially overlap one another such that transition of the first panel member from the first, deployed position to the second, stowed position thereby transitions the second panel member to the stowed position. In a similar respect, the first and second panel members preferably at least partially overlap one another such that transition of the second panel member from the second, stowed position to the first, deployed position thereby transitions the first panel member to the deployed position.

According to another aspect of this embodiment, the plurality of panel members includes a center panel member, which extends transversely across an underside portion of the front vehicle structure, and at least two side panel members. A portion of the forward surface of the at least two side panel members overlaps the rearward surface of the center panel member on laterally opposing sides thereof.

In accordance with yet another aspect, the first, deployed position is preferably a generally vertical orientation, whereas the second, stowed position is a generally horizontal orientation. Ideally, the plurality of panel members pivots in a generally rearward direction with respect to the vehicle. It is further preferred that each panel member pivots about a respective, unique axis.

According to yet another aspect of this embodiment, the plurality of panel members are pivoted into the first, deployed position by an actuator, and biased into the second, stowed position by a biasing member. Moreover, the plurality of panel members is preferably characterized by a lack of a direct coupling to one another.

In accordance with another embodiment of the present invention, an air dam assembly is provided for improving the aerodynamic characteristics of a motor vehicle. The air dam assembly includes a center panel member configured to suspend transversely from underneath the front vehicle structure. The center panel member is adapted to selectively pivot between a deployed position, in which the center panel member is in a non-horizontal orientation, and a stowed position, in which the center panel member is in a generally horizontal orientation. The air dam assembly also includes one or more side panel members that are configured to suspend from underneath the front vehicle structure in curvilinear relation to the center panel member. The side panels also pivot between a deployed position, in which each side panel member is in a non-horizontal orientation, and a stowed position, in which each side panel member is in a generally horizontal orientation. The center and side panel members sufficiently overlap such that pivoting the center panel member from the deployed position to the stowed position thereby pivots the side panel members to the stowed position, folded up against the underbody of the vehicle. Moreover, the center and side panel members sufficiently overlap such that pivoting one of the side panel members from the stowed position to the deployed position thereby pivots the center panel member to the deployed position, extending downward into proximity with the road surface.

According to one aspect of this particular embodiment, the air dam assembly includes first, second, third and fourth side panel members. In this instance, respective forward surfaces of the first and second side panel members press against the rearward surface of the center panel member on laterally opposing sides thereof. In addition, the forward surface of the third side panel member presses against a rearward surface of the first side panel member, whereas the forward surface of the fourth side panel member presses against the rearward surface of the second side panel member.

According to another aspect, all of the panel members pivot in a generally rearward direction with respect to the vehicle. Additionally, the center panel member preferably pivots about one axis, whereas each of the side panel members pivots about an axis that is different from the center panel member axis. Finally, a biasing member preferably biases the outer most side panel members (and thus the center panel member) into the stowed position. Similarly, an actuator pivots the center panel member (and thus the side panel members) into the deployed position.

In accordance with yet another embodiment of this invention, a motorized vehicle is provided. The front-end of the vehicle structure has a front fascia mounted thereto. The motor vehicle includes an air dam assembly that is suspended from an underside of the front vehicle structure proximate to the front fascia. The air dam assembly has a curved configuration in the plan view with respect to the vehicle. The air dam assembly includes a center panel member that extends generally transversely across the front vehicle structure, and four side panel members. The panel members are configured to selectively pivot between a deployed position, in which each panel member is in a non-horizontal orientation, and a stowed position, in which each panel member is in a substantially horizontal orientation.

Respective forward surfaces of the first and second side panel members press against the rearward surface of the center panel member on laterally opposing sides thereof. The forward surface of the third side panel member presses against the rearward surface of the first side panel member, whereas the forward surface of the fourth side panel member presses against the rearward surface of the second side panel member. As such, pivoting the center panel member from the deployed position to the stowed position thereby pivots the side panel members to the stowed position, and pivoting the third and fourth side panel members from the stowed position to the deployed position thereby pivots the center panel member and the first and second side panel members to the deployed position.

The above features and advantages, and other features and advantages of the present invention, will be readily apparent from the following detailed description of the preferred embodiments and best modes for carrying out the present invention when taken in connection with the accompanying drawings and appended claims.

BRIEF DESCRIPTION OF THE DRAWINGS

FIG. 1A is a perspective view illustration of an exemplary motor vehicle with a retractable curved air dam in accordance with a preferred embodiment of the present invention mounted thereto and shown in a deployed position;

FIG. 1B is a perspective view illustration of the retractable curved air dam of FIG. 1A shown in a representative intermediate position; and FIG. 1C is a perspective view illustration of the retractable curved air dam of FIGS. 1A and 1B shown in stowed position.

DESCRIPTION OF THE PREFERRED EMBODIMENTS

Referring to the drawings, wherein like reference numbers refer to like components throughout the several views, FIGS. 1A-1C are perspective view illustrations of the underside front-end structure of an exemplary motor vehicle, generally indicated at 10, with which the present invention may be incorporated and practiced. It should be readily understood that the vehicle 10 shown herein is merely a representative application by which the present invention may be utilized. As such, the present invention is by no means limited to the vehicle configuration shown in the drawings. For example, although the vehicle 10 is depicted in FIGS. 1A-1C as a standard passenger car, the present invention can be incorporated into any motorized vehicle, such as, but not limited to, sport utility vehicles, light trucks, heavy duty vehicles, minivans, buses, tractor-trailers, etc. Finally, the drawings presented herein have been greatly simplified and are not to scale, and are thus provided purely for instructional purposes. Thus, the specific and relative dimensions and orientations shown in the drawings are not to be considered limiting.

Referring first to FIG. 1A, the vehicle 10 has a vehicle body with front vehicle structure, designated generally at 12, that is forward of and adjacent to rear vehicle structure (not visible in the views provided). A front fascia 14 extends transversely across the forward most portion of the front vehicle structure 12, and covers or conceals, among other things, an energy absorbing bumper substructure (not visible). The front fascia 14 is forward of a movable hood assembly 16 which spans over and covers an engine compartment (also not visible). The front fascia 14 partially defines the peripheral contour of a front-left and a front-right wheel well 18 and 20, respectively.

In accordance with this invention, the vehicle 10 includes a retractable air dam assembly, indicated generally throughout the several views by reference numeral 22, that is engineered to improve the aerodynamic characteristics of the motor vehicle 10—e.g., reduce the coefficient of drag during vehicle operation. The air dam assembly 22 is suspended from underneath the front vehicle structure 12, proximate to the front fascia 14 and generally forward of the front-left and front-right wheel wells 18, 20. As will be explained further hereinbelow, the air dam assembly 22 has a curved configuration in the plan view with respect to the vehicle 10. As will be readily recognized from the following description, the air dam assembly 22 increases vehicle fuel economy, eliminates inadvertent damage or breakage, improves convective airflow, and eliminates the additional packaging space required for prior art retractable air dams.

Unlike prior art air deflectors, the air dam assembly 22 of the present invention is segmented or sectioned to include a plurality of individual panel members, collectively represented herein by a center panel member 24 and four side panel members—first, second, third and fourth side panel members 26, 28, 30 and 32, respectively. Each panel member 24-32 preferably consists of a unitary, preformed, polygonal plate fabricated from a material known to have a suitable strength for the intended use of the air dam assembly 22, such as a flexible rubber, plastic polymer, or fiber-reinforced polymer. However, it is within the scope and spirit of the present invention that the plate members 24-32 take on additional shapes and cross sections. To this regard, the number of panel members 24-32, as well as the individual and relative dimensions, orientations, geometries, and materials may be modified depending upon the particular design needs of the intended application.

The panel members 24-32 are adapted to selectively transition between a first, deployed position (shown in FIG. 1A) and a second, stowed position (shown in FIG. 1C). The first, deployed position (FIG. 1A) is preferably a generally vertical orientation, extending downward from the vehicle undercarriage into proximity with the road surface. On the other hand the second, stowed position (FIG. 1C) is a generally horizontal orientation, folded up against the underbody of the vehicle in a generally flush manner. However, the air dam assembly 22 may be secured at any predetermined position between the first and second positions (one such position shown, for example, in FIG. 1B) depending, for example, on vehicle speed and roadway conditions.

Ideally, the plurality of panel members 24-32 pivots in a generally rearward direction with respect to the vehicle 10. Although not required to practice the present invention, it is also desired that each panel member 24-32 pivots about a respective, unique axis, as best seen in FIG. 1C. Specifically, the center panel member 24 pivots about a first axis A1, whereas the side panels 26, 28, 30, 32 respectively pivot about second, third, fourth and fifth axes A2, A3, A4 and A5, that are different from the first axis A1. It should be recognized that the individual and relative orientation of the various axes A1-A5 may be modified to accommodate different plan-view curvatures of the air dam assembly 22, as well as distinctive vehicle packaging requirements.

The "foldability" of the retractable air dam assembly 22 is achieved by the abovementioned sectioning or segmenting of the curved air dam 22, and corresponding "shingled" arrangement which the individual panel members 24-32 take on. For example, as seen in FIG. 1A, the center panel member 24 extends generally transversely across the front vehicle structure 12, set back from the front fascia 14. Each of the side panel members 26, 28, 30, 32 is offset laterally outboard from the center panel member 24. In addition, each side panel member 26, 28, 30, 32 is disposed in curvilinear relation to the center panel member 24, set back in a rearward direction therefrom. A laterally inboard portion of respective forward-facing surfaces of the first and second side panel members 26, 28 press against a complementary portion of the rearward-facing surface of the center panel member 24, on laterally opposing sides thereof. In addition, a laterally inboard portion of the forward-facing surface of the third side panel member 30 presses against a complementary portion of the rearward-facing surface of the first side panel member 26. Similarly, a laterally inboard portion of the forward-facing surface of the fourth side panel member 32 presses against a complementary portion of the rearward-facing surface of the second side panel member 28.

By "shingling" the panel members 24-32 to overlap one another as described above, pivoting the center panel member 24 from the deployed position (FIG. 1A) to the stowed position (FIG. 1C) will thereby pivot all of the side panels 26, 28, 30, 32 to the stowed position. Moreover, pivoting the laterally outboard most side panels—i.e., third and fourth side panel members 30, 32, from the stowed position (FIG. 1C) to the deployed position (FIG. 1A) will thereby pivot the center panel member 24 and the first and second side panel members 26, 28 to the deployed position.

According to preferred practice, a biasing member, such as a spring-biased armature assembly (shown schematically at 34 in FIG. 1A) preferably biases the outer most side panel members 30, 32 and, thus, center panel member 24 and first and second side panel members 26, 28, into the refracted position (FIG. 1C). In addition, an actuator, such as an electric motor assembly (shown schematically at 36 in FIG. 1A), pivots the center panel member 24 (and thus the side panel members 26, 28, 30, 32) into the deployed position (FIG. 1C). Alternatively, the panel members 24-32 may be biased into the deployed position by the spring-biased armature assembly 34, and pivoted into the stowed position by the electric motor assembly 36 without departing from the intended scope of the present invention. It should be recognized, however, that positioning the retractable air dam assembly 22 may be accomplished solely through automated motion—i.e., hydraulic devices, pneumatic devices, magnetorheologic devices, electro-mechanical devices, etc.

While the best modes for carrying out the present invention have been described in detail, those familiar with the art to which this invention relates will recognize various alternative designs and embodiments for practicing the invention within the scope of the appended claims.

The invention claimed is:

1. An air dam assembly for improving the aerodynamic characteristics of a motor vehicle having front vehicle structure, the air dam assembly comprising:

a plurality of panel members configured to pivotably attach to the front vehicle structure in curvilinear relation to one another and to selectively transition between a first position, in which said plurality of panel members are in a deployed state, and a second position, in which said plurality of panel members are in a stowed state; and wherein said plurality of panel members includes first and second panel members at least partially overlapping one another such that transition of said first panel member from said first position to said second position thereby transitions said second panel member to said second position.

2. The air dam assembly of claim 1, wherein said plurality of panel members includes first and second panel members at least partially overlapping one another such that transition of said second panel member from said second position to said first position thereby transitions said first panel member to said first position.

3. The air dam assembly of claim 1, wherein said plurality of panel members includes a center panel member extending transversely underneath the front vehicle structure, and at least two side panel members with at least a portion of respective forward surfaces of said at least two side panel members overlapping a rearward surface of said center panel member on laterally opposing sides thereof.

4. The air dam assembly of claim 1, wherein said first position is a generally vertical orientation.

5. The air dam assembly of claim 1, wherein said second position is a generally horizontal orientation.

6. The air dam assembly of claim 1, wherein said plurality of panel members pivot in a generally rearward direction with respect to the vehicle.

7. The air dam assembly of claim 1, wherein said plurality of panel members is pivoted into said first position by an actuator, and biased into said second position by a biasing member.

8. The air dam assembly of claim 1, wherein each of said plurality of panel members pivots about a respective unique axis.

9. The air dam assembly of claim 1, wherein said plurality of panel members is characterized by a lack of a direct coupling to one another.

10. An air dam assembly for improving the aerodynamic characteristics of a motor vehicle having front and rear vehicle structure, the air dam assembly comprising:

a center panel member configured to suspend transversely from underneath the front vehicle structure and selectively pivot between a first deployed position, in which said center panel member is in a non-horizontal orientation, and a first stowed position, in which said center panel member is in a generally horizontal orientation; and at least one side panel member configured to suspend from underneath the front vehicle structure in curvilinear relation to said center panel member and selectively pivot between a second deployed position, in which said at least one side panel member is in a non-horizontal orientation, and a second stowed position, in which said at least one side panel member is in a generally horizontal orientation;

wherein said center and at least one side panel members sufficiently overlap such that pivoting said center panel member from said first deployed position to said first stowed position thereby pivots said at least one side panel member to said second stowed position; and wherein said center and at least one side panel members sufficiently overlap such that pivoting said at least one side panel member from said second stowed position to said second deployed position thereby pivots said center panel member to said first deployed position.

11. The air dam assembly of claim 10, wherein said at least one side panel member includes at least two side panel members, wherein at least a portion of respective forward surfaces of said at least two side panel members press against a rearward surface of said center panel member on laterally opposing sides thereof.

12. The air dam assembly of claim 10, wherein said at least one side panel member includes first, second, third and fourth side panel members, wherein respective forward surfaces of said first and second side panel members press against a rearward surface of said center panel member on laterally opposing sides thereof, wherein a forward surface of said third side panel member presses against a rearward surface of said first side panel member, and wherein a forward surface of said fourth side panel member presses against a rearward surface of said second side panel member.

13. The air dam assembly of claim 10, wherein said center and at least one side panel members pivot in a generally rearward direction with respect to the vehicle.

14. The air dam assembly of claim 13, wherein said center panel member pivots about a first axis, and said at least one side panel member pivots about a second axis different from said first axis.

15. The air dam assembly of claim 10, wherein said first and second deployed positions are of a generally vertical orientation.

16. The air dam assembly of claim 10, wherein said center and at least one side panel members are characterized by a lack of a direct coupling to each other.

17. The air dam assembly of claim 10, wherein said center panel member is pivoted into said first deployed position by an actuator, and said at least one side panel member is biased into said second stowed position by a biasing member.

18. A motorized vehicle having a vehicle body with front vehicle structure in opposing forward relation to rear vehicle structure, the front vehicle structure having a front fascia mounted thereto, the motor vehicle comprising:

an air dam assembly suspended from an underside of the front vehicle structure proximate to the front fascia, said air dam assembly having a curved configuration in the plan view with respect to the vehicle, the air dam assembly including:

a center panel member extending generally transversely across the front vehicle structure and configured to selectively pivot between a first deployed position, in which said center panel member is in a non-horizontal orientation, and a first stowed position, in which said center panel member is in a substantially horizontal orientation; and first, second, third and fourth side panel members with respective forward surfaces of said first and second side panel members pressing against a rearward surface of said center panel member on laterally opposing sides thereof, a forward surface of said third side panel member pressing against a rearward surface of said first side panel member, and a forward surface of said fourth side panel member pressing against a rearward surface of said second side panel member, said side panel members configured to selectively pivot between a second deployed position, in which said side panel members are in a non-horizontal orientation, and a second stowed position, in which said side panel members are in a substantially horizontal orientation;

wherein pivoting said center panel member from said first deployed position to said first stowed position thereby pivots said side panel members to said second stowed position; and wherein pivoting said third and fourth side panel members from said second stowed position to said second deployed position thereby pivots said center panel member and said first and second side panel members to respective ones of said first and second deployed position.

* * * * *